July 23, 1957  E. HAVNEN  2,800,202
WHEEL BRAKE
Filed June 7, 1954

Egil Havnen
INVENTOR.

BY *[signature]*

Atty.

United States Patent Office 2,800,202
Patented July 23, 1957

2,800,202

WHEEL BRAKE

Egil Havnen, Brooklyn, N. Y.

Application June 7, 1954, Serial No. 434,894

7 Claims. (Cl. 188—74)

This invention relates to improvements in brakes for use on vehicles and more specifically it refers to an improved brake mechanism which has more than one braking surface and which is adapted to better dissipate the heat generated by the braking action and which is of simpler construction.

The main object of my invention is to provide a brake of a simple and effective construction which will give better braking action by having more than one braking surface.

Another object of my invention is to provide a brake in which the molded brake shoes can be replaced by anyone in a very short time without any special tools.

Still another object of my invention is to provide a brake which can be manufactured and sold at low cost and which is adaptable for all types of vehicles.

Other objects and advantages of my invention will be apparent during the course of the following description and claims.

Figure 2:
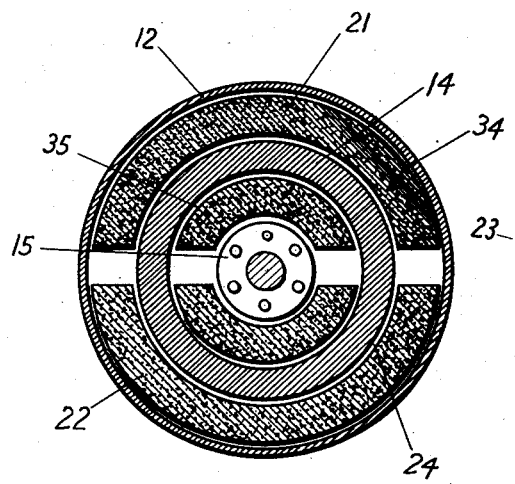
Figure 3:
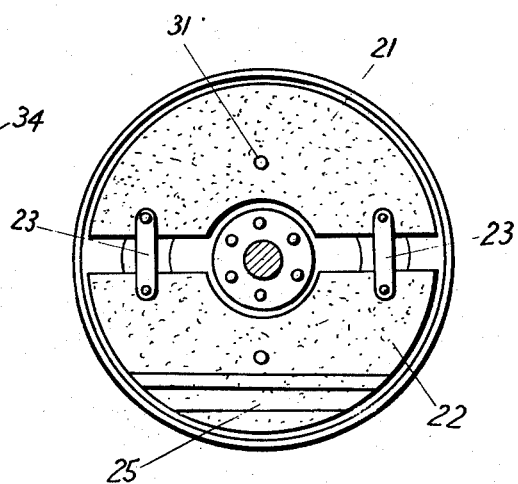
Figure 1:
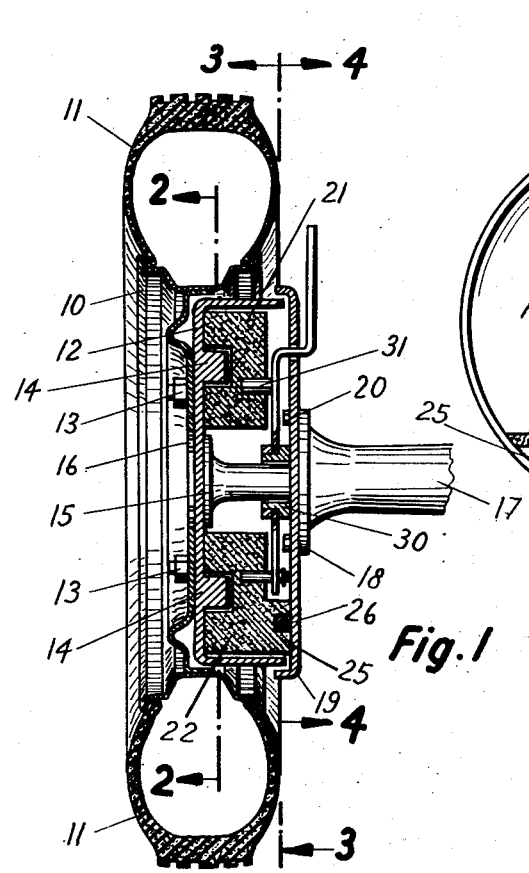
Figure 4:
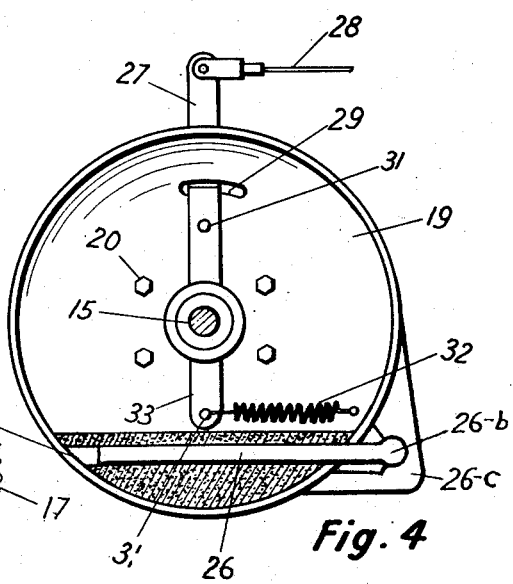

In the accompanying drawing, forming a part of this specification, and in which like numerals are employed to designate like parts throughout the same, Figure 1 represents a vertical section of an automobile wheel furnished with a brake embodying my invention, Figure 2 represents a section taken along the line 2—2 in Figure 1, Figure 3 represents a partial section taken along the line 3—3 in Figure 1, and, Figure 4 represents a partial sectional elevation taken along the line 4—4 in Figure 1.

In the drawing, wherein for the purpose of illustration is shown a preferred embodiment of my invention, the brake shown in Figure 1 is for an automobile but could be arranged equally well in a similar way for railroad cars or other vehicles as well as for machines having revolving parts requiring brakes. The wheel 10 with the tire 11 carries the brake drum 12 mounted on the inside of the wheel. The brake drum 12 is preferably made as a separate part which can be easily replaced when desired by unscrewing the bolts 13. This has the advantage that when the brake drum wears, it is not necessary to go into expensive machine operations for the tooling up of same as is now commonly practiced. The brake drum 12 has an annular ring 14, see Figures 1 and 2, which is an integral part of the brake drum. The brake drum 12 and the wheel 10 are fastened on the end of the axle 15 by means of bolts 16 which will hold the wheel in the conventional manner.

The axle 15 runs in bearings in the conventional bearing housing 17 which terminates in flange 18. A circular rear cover 19 is mounted upon flange 18 by means of bolts 20 and covers up the entire rear side of the brake drum 12 but has clearance from same so that the brake drum may rotate freely without touching said cover.

A pair of brake shoes 21 and 22 are located in the brake drum 12 and are linked together with links 23 as shown in Figure 3. On the front side facing the wheel, the brake shoes 21 and 22 have an annular groove 24 which fits loosely over the annular ring 14 of the brake drum, see Figures 1 and 2. For the purpose of simplicity of illustration of the principle of the present brake only one annular ring 14 is shown in the drawings, but it is obvious to a person skilled in the art that a plurality of such rings could be used equally well thereby greatly increasing the braking action. The lower brake shoe 22 has a groove 25 in which a rod 26 is placed to act as a stop for the brake shoes. The rod 26 has a semi-cylindrical head 26-b at one end which fits in a socket in a part 26-c of the cover 19 and is rotatable in same inside of a small angle. The links 23 prevent rotation of the brake shoe 21. It should be noted that the brake shoes 21 and 22 have a floating motion and is jammed against the inner and outer faces of the annular ring 14. It is obvious that instead of the links 23, one may also, if desired, put another rod similar to 26 in a slot in brake shoe 21 and thereby eliminate the links 23. The articulating action of the rod 26 permits efficient stopping of the brake shoes without jamming and locking of same.

A lever 27 operatable at the remote point by means of the wire of rod 28 extends through the slot 29 in the cover 19 and is rotatably mounted in a bearing 30 on axle 15. The lever 27 has two pins 31 which extend into holes in the brake shoes 21 and 22. The pins 31 are integral parts of the lever 27 and serve to give the brake shoes a slight motion. A coil spring 32 is fastened at one end on cover 19 and with the other end fastened to the lower end 33 of the lever 27.

The operation of my invention is as follows:

By pulling the wire 28, lever 27 with pins 31 will give the brake shoes 21 and 22 an approximately parallel motion due to the links 23. The upper brake shoe 21 will move into contact with the surface 34 on the outside of the annular ring 14 and at the same time, it will also get into contact with the inner surface 35 of the same ring, see Figure 2. The same thing will happen with the lower brake shoe 22 which will also make contact and braking action with the outer and inner surfaces of the annular ring. If more than one ring is provided, the braking action will be multiplied. Also, the braking forces have a tendency to balance one another thereby minimizing the possibility of locking brakes and making operation easier. Attention is called to the peculiar braking action which is the real basis for the novelty of my invention. The action is similar to a screw action in that the brake shoes 21 and 22 have a spiral or screw motion in their coaction with the annular ring 14. The action is furthermore eccentric and floating, so that when a braking pull is applied to wire 28 the brake shoe 22 will slide forward along the direction of rotation of the annular ring, or brake drum 14 and will jam its braking faces against the drum both on the outside of same, on one side; and on the inside of same on the other side of the axis. It is also important to note that by varying the radius of the pins 31 in reference to the axle 15, one may get a greater or lesser braking moment for a given pull on wire 28. As soon as the pull on wire 28 is released, the spring 32 will return the brake shoes 21 and 22 to their free position which is adjustable by letting lever 27 come up against the end of slot 29 whereby the slot acts as a stop.

It is to be understood that the form of my invention, herewith shown and described, it to be taken as a preferred example of the same and that various changes in the shape, size and arrangement of parts may be resorted to, without departing from the spirit of my invention or the scope of the subjoined claims.

Having thus described my invention, I claim:

1. A brake of the character described having in combination; a main bearing; a rotatable axle journalled in said bearing; a wheel mounted on said axle; a cylindrical brake drum removably mounted on the side of said wheel adjacent to said bearing, said drum having an internal, annular ring concentric with said axle; a cylindrical cover fitting over the open side of said brake drum, said cover being mounted upon the end of said main bearing; a pair of brake shoes of semi-circular shape located in said brake drum, said pair of brake shoes having a stop consisting of an articulated rod held in a socket in said cover, one of said brake shoes having a slot fitting over said rod, said brake shoes having an annular groove on one side fitting loosely over said annular ring in said brake drum; a pair of links connecting said brake shoes, and a spring loaded lever engaging said brake shoes whereby same may be brought into frictional contact with said annular ring.

2. A brake of the character described having in combination; a main bearing; a rotatable axle journalled in said bearing; a wheel mounted on said axle; a cylindrical brake drum removably mounted on the side of said wheel adjacent to said bearing, said drum having an internal, annular ring concentric with said axle; a cylindrical cover fitting over the open side of said brake drum, said cover being mounted upon the end of said main bearing and having a semi-circular slot concentric with said axle; a pair of brake shoes comprising two half, ring shaped parts located in said brake drum said pair of brake shoes having a stop consisting of an articulated rod held in a socket in said cover, one of said brake shoes having a slot fitting over said rod, said brake shoes having an annular groove on one side fitting loosely over said annular ring in said brake drum; a pair of links movably fastened with both ends, one end of each of said brake shoes, one link being located on each side of said axle, and a spring loaded lever extending through said slot in said cylindrical cover and being in engagement with both of said brake shoes whereby same may be brought into frictional contact with said annular rings.

3. A brake drum, a cover fitting over part of said brake drum, a pair of brake shoes located in said brake drum, said brake shoes having a stop consisting of an articulated rod held in a socket in said cover, one of said brake shoes having a slot fitting over said rod, an annular ring in said brake drum, a spring loaded lever engaging said brake shoes, whereby the latter may be brought into frictional contact with said annular ring.

4. In a vehicle having a bearing part substantially fixed with respect to the body of the vehicle, a brake drum mounted for rotation with respect to said part and provided with an annular ring fast on the drum and having inner and outer peripheral walls coaxial with the axis of revolution of the drum, a pair of brake shoes provided with arcuate walled slots receiving said ring, the walls of the slots being adapted to engage against the peripheral walls of the ring, a spring loaded lever engaging said brake shoes for shifting the shoes relative to each other in approximately parallel directions of opposite sense, one of said shoes being provided with a recess extending approximately parallel with said directions and substantially in a plane to which said axis of revolution is perpendicular, a stop member for said one shoe consisting of a rod longitudinally slidable in and having one end portion in said recess, and means for mounting the other end portion of the rod for pivotal movement in said plane about a point fixed with respect to the bearing part for the rod to impart a slight spiral motion to ends of the brake shoes when the shoes are shifted.

5. In a vehicle having a bearing part substantially fixed with respect to the body of the vehicle, a brake drum mounted for rotation with respect to said part and provided with an annular ring fast on the drum and having inner and outer peripheral walls coaxial with the axis of revolution of the drum, a pair of brake shoes shiftable with respect to each other in approximately parallel directions and provided with arcuate walled slots receiving said ring, the walls of the slots being adapted to engage against the peripheral walls of the ring, a spring loaded lever engaging said brake shoes for shifting the shoes relative to each other in approximately parallel directions of opposite sense, one of said shoes being provided with a recess extending approximately parallel with said directions, a constraining member for said one shoe consisting of a rod loosely longitudinally and relatively slidable in, and having one end portion in said recess, and means for mounting the other end portion of the rod to prevent longitudinal movement of said one end portion with respect to the bearing part.

6. In a vehicle having a bearing part substantially fixed with respect to the body of the vehicle, a brake drum mounted for rotation with respect to said part and provided with an annular ring fast on the drum and having inner and outer peripheral walls coaxial with the axis of revolution of the drum, a pair of brake shoes provided with arcuate walled slots receiving said ring, the walls of the slots being adapted to engage against the peripheral walls of the ring, one of said shoes being provided with a recess extending into the shoe and substantially in a plane to which said axis of revolution is perpendicular, a stop consisting of a rod having one end portion slidable in said recess, means for mounting the other end portion of the rod for pivotal movement in said plane about a point fixed with respect to the bearing part, and a spring loaded lever engaging said brake shoes for bringing the latter into frictional engagement with the ring.

7. In combination, a brake drum, a cover fitting over part of said drum, a pair of brake shoes in said drum, said brake shoes having a stop consisting of a rod mounted for slight pivotal movement about a point fixed with respect to the cover, one of said shoes having a recess fitting over said rod, an annular ring in the drum, a spring loaded lever engaging said brake shoes, whereby the latter may be brought into frictional contact with said annular ring.

References Cited in the file of this patent
UNITED STATES PATENTS

| | | |
|---|---|---|
| 852,659 | Falter | May 7, 1907 |
| 1,711,321 | McNelles | Apr. 30, 1929 |
| 1,792,334 | Thomson | Feb. 10, 1931 |